(12) United States Patent
Karpey et al.

(10) Patent No.: US 9,396,730 B2
(45) Date of Patent: Jul. 19, 2016

(54) CUSTOMER IDENTIFICATION THROUGH VOICE BIOMETRICS

(71) Applicant: Bank of America Corporation, Charlotte, NC (US)

(72) Inventors: David Karpey, Harrisburg, NC (US); Mark Pender, Moorestown, NJ (US)

(73) Assignee: Bank of America Corporation, Charlotte, NC (US)

( * ) Notice: Subject to any disclaimer, the term of this patent is extended or adjusted under 35 U.S.C. 154(b) by 155 days.

(21) Appl. No.: 14/041,012

(22) Filed: Sep. 30, 2013

(65) Prior Publication Data

US 2015/0095028 A1 Apr. 2, 2015

(51) Int. Cl.
*G10L 15/00* (2013.01)
*G10L 17/26* (2013.01)
*H04M 3/493* (2006.01)
*G10L 17/24* (2013.01)
*G07C 9/00* (2006.01)
*G10L 21/00* (2013.01)

(52) U.S. Cl.
CPC ............ *G10L 17/26* (2013.01); *G07C 9/00158* (2013.01); *G10L 17/24* (2013.01); *H04M 3/493* (2013.01)

(58) Field of Classification Search
CPC ....... G10L 17/22; G10L 17/06; G10L 17/005; G10L 17/26; G10L 17/24; G07C 9/00158; H04M 3/493
USPC .......................................... 704/246, 247, 273
See application file for complete search history.

(56) References Cited

U.S. PATENT DOCUMENTS

| | | | | |
|---|---|---|---|---|
| 2003/0229492 | A1* | 12/2003 | Nolan ..................... | G10L 17/06 704/247 |
| 2011/0257975 | A1* | 10/2011 | Novack et al. ................ | 704/246 |
| 2013/0006626 | A1* | 1/2013 | Aiyer ..................... | G10L 17/24 704/235 |
| 2013/0091052 | A1* | 4/2013 | Kaperdal et al. ................ | 705/39 |

FOREIGN PATENT DOCUMENTS

JP 2004094158 A * 3/2004

OTHER PUBLICATIONS

"Nuance VocalPassword v9 Product Description." Nuance Communications, Inc. 2013. Retrieved from <http://www.nuance.com/ucmct/groups/imaging/@web-enus/documents/collateral/nucc1021vocalpasswordv9proddes.pdf> on Nov. 20, 2013.

* cited by examiner

*Primary Examiner* — Thierry L Pham
(74) *Attorney, Agent, or Firm* — Banner & Witcoff, Ltd.; Michael A. Springs (57) ABSTRACT

Systems and methods for determining an identity of an individual are provided. Audio may be received that includes a key phrase spoken by the individual, and the key phrase may include an identifier spoken by the individual. A key phrase voice print and key phrase text corresponding to the audio may be obtained. The key phrase text may include text corresponding to the identifier spoken by the individual. Voice prints may be retrieved based on the text corresponding to the identifier, and the voice prints may be provided to a voice biometric engine for comparison to the key phrase voice print. The individual may be authenticated based on a comparison of the key phrase voice print to the voice prints. The identifier may include a first name and a last name of the individual.

19 Claims, 7 Drawing Sheets

CUSTOMER IDENTIFICATION THROUGH VOICE BIOMETRICS

TECHNICAL FIELD

The present invention generally relates to voice biometrics and particularly relates to determining the identity of an individual based on the voice of that individual.

BACKGROUND

Voice biometrics technology continues to advance. Two approaches to voice biometrics technology may be currently available: passive voice biometrics and active voice biometrics. With passive voice biometrics, any speech received from an individual may be converted to a voice print and matched to a previously obtained voice print. With active voice biometrics, a phrase spoken by an individual may be converted to a voice print and matched to a previously obtained voice print corresponding to that phrase. In either case, voice biometrics may indicate whether the individuals associated with the voice prints are the same. In this way, current voice biometrics technology may be employed to authenticate the identity of an individual.

It will be appreciated, however, that these approaches may require the identity—or at least the purported identity—of the individual be determined in order to determine which voice print to select from a pool of voice prints for comparison. It may be tempting to simply compare the speech received from an individual to each voice print in the pool of voice prints. Such an approach, however, is impractical in situations where the pool of voice prints is relatively large. Business entities, for example, may maintain hundreds of thousands of voice prints for their customers in order to perform customer authentication.

As a result, current approaches may require individual to first identify themselves through some other means in order to locate a voice print to compare to speech received from those individuals. For example, current approaches may require an individual to identify themselves by typing in an account number, customer number, or other type of identifier. Individuals may find such approaches time-consuming, cumbersome, and possibly frustrating when such information is not readily available or accessible.

Therefore, a need exists for an approach to voice biometrics that both identifies and authenticates an individual based on the voice of that individual

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a method for determining an identity of an individual. Audio may be received that includes a key phrase spoken by the individual, and the key phrase may include an identifier spoken by the individual. A key phrase voice print and key phrase text corresponding to the audio may be obtained. The key phrase text may include text corresponding to the identifier spoken by the individual. Voice prints may be retrieved based on the text corresponding to the identifier, and the voice prints may be provided to a voice biometric engine for comparison to the key phrase voice print. The identifier may include a first name and a last name of the individual.

A second aspect described herein provides a system for determining an identity of an individual. The system may include at least one processor and memory storing computer readable instructions that, when executed by the at least one processor, cause the processor to provide various components used to determine the identity of an individual. A communication portal may receive a communication that includes audio. The audio may include a key phrase spoken by the individual, and the key phrase may include an identifier spoken by the individual. A voice print engine may obtain a key phrase voice print corresponding to the audio. A speech-to-text engine may obtain key phrase text also corresponding to the audio. The key phrase text may include text that corresponds to the identifier spoken by the individual. A voice print database may provide a set of voice prints based on the text corresponding to the identifier, and the voice prints may be made available to a voice biometric engine for comparison to the key phrase voice print.

A third aspect described herein provides non-transitory computer-readable media having instructions for identifying and authenticating an individual using a computing device. The computing device may receive audio that includes a name of the individual, obtain a current voice print that corresponds to the audio, convert the audio to text, and extract the name of the individual from the text. The computing device may also cause the computing device to query a voice print database with the name of the individual to obtain a set of stored voice prints that are associated with that name. The computing device may further compare the current voice print to the set of stored voice prints in order to obtain confidence scores. The computing device may authenticate the individual when one of the confidence scores is greater than a predetermined upper threshold and grant the individual access to one or more services provided by a banking system when the individual is authenticated.

These and additional aspects will be appreciated with the benefit of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Aspects of the present disclosure are directed towards identifying and authenticating an individual based on the voice of that individual. As noted above, current approaches may authenticate an individual based on the voice of that individual only after determining the identity of that individual. The approaches set forth below improve upon current approaches by using the voice of an individual to first determine the identity of that individual and then authenticate the individual. Stated differently, the approaches described below utilize the voice of an individual as both an identification token to identify the individual and as an authentication token to authorize the individual (e.g., and thereby provide the individual with access to one or more secured systems and/or services).

Aspects described herein advantageously reduce the number of comparisons performed to a voice print that matches the voice of an individual. By reducing the number of comparisons performed, a matching voice print may be located in a relatively small response time. Accordingly, the approaches described below may thus be employed in situations to quickly and efficiently determine the identity on an individual.

As an example, a banking institution may employ the approaches described below to determine the identity of an individual requesting remote access to a bank account or other banking services, e.g., over the phone. Instead of prompting individuals for access credentials (e.g., an account number or an access identifier), an individual may identify himself or herself by speaking his or her name. The identity of an individual is determined and the individual is authorized based on the voice of the individual. Due to the quick response time in determining the identity of the individual, a positive user experience may be provided. Additionally, identifying an individual based on voice rather than access credentials improves the user experience since access credentials might not be readily accessible or available. Other benefits and advantages will be appreciated with the benefit of the additional disclosures set forth below.

Identification, as used in this description, may refer to the determining the identity of an individual. The first name and last name of an individual may indicate the identity of that individual. Therefore according to some aspects of this disclosure, identification may refer to determining the first name and last name of an individual. It will be appreciated, however, that other types of identifiers may also indicate the identity of an individual. Therefore according to other aspects of this disclosure, identification may refer to determining those other types of identifiers for an individual.

Authentication, as used in this description, may refer to verifying the identity of an individual. When the identifier is the name of the individual, authentication may refer to verifying that a name provided by the individual matches the actual name of the individual. When the identifier is another type of identifier associated with the individual, authentication may refer to verifying that an identifier provided by the individual matches an actual identifier associated with the individual.

Furthermore, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal.

Figure 1:
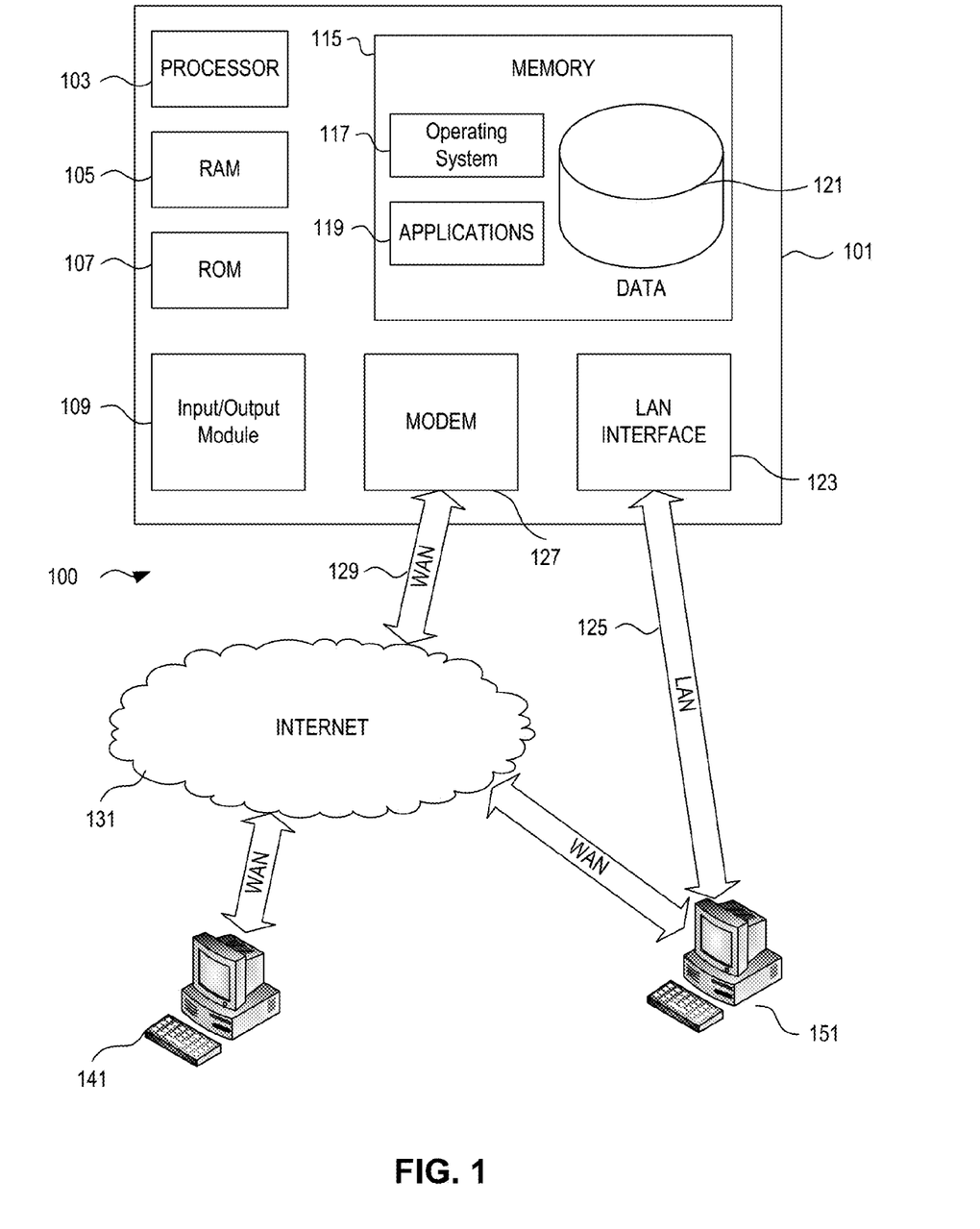
FIG. 1 is a block diagram of an example operating environment in which various aspects of the disclosure may be implemented.

FIG. 1 illustrates a block diagram of at least a portion of a voice identification and verification system 101 (e.g., a computer server) in communication system 100 that may be used according to an illustrative embodiment of the disclosure. The system 101 may have a processor 103 for controlling overall operation of the system and its associated components, including RAM 105, ROM 107, input/output (I/O) module 109, and memory 115.

I/O 109 may include a microphone, keypad, touch screen, and/or stylus through which a user of the voice identification and verification system 101 may provide input, and may also include one or more of a speaker for providing audio output and a video display device for providing textual, audiovisual and/or graphical output. Software may be stored within memory 115 and/or storage to provide instructions to processor 103 for enabling the system 101 to perform various functions. For example, memory 115 may store software used by the system 101, such as an operating system 117, application programs 119, and an associated database 121. Processor 103 and its associated components may allow the system 101 to run a series of computer-readable instructions to obtain a voice sample, voice print, and determine the identity of the individual that provided the voice sample based on the voice print.

The system 101 may operate in a networked environment supporting connections to one or more remote computers, such as terminals 141 and 151. The terminals 141 and 151 may be personal computers or servers that include many or all of the elements described above relative to the system 101. Alternatively, terminal 141 and/or 151 may be a data store that utilized by the system 101. The network connections depicted in FIG. 1 include a local area network (LAN) 125 and a wide area network (WAN) 129, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as the Internet 131. It will be appreciated that the network connections shown are illustrative and other means of establishing a communications link between the computers may be used. Various well-known protocols such as TCP/IP, Ethernet, FTP, HTTP and the like may be used to establish connections and/or facilitate communications between elements of system 101 and various other computing devices.

Additionally, one or more application programs 119 used by the voice identification and verification system 101 according to an illustrative embodiment of the disclosure may include computer executable instructions determining the identity of an individual based on a voice sample from the individual.

The voice identification and verification system 101 and/or terminals 141 or 151 may also be mobile terminals, such as smart phones, personal digital assistants (PDAs), and the like, including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
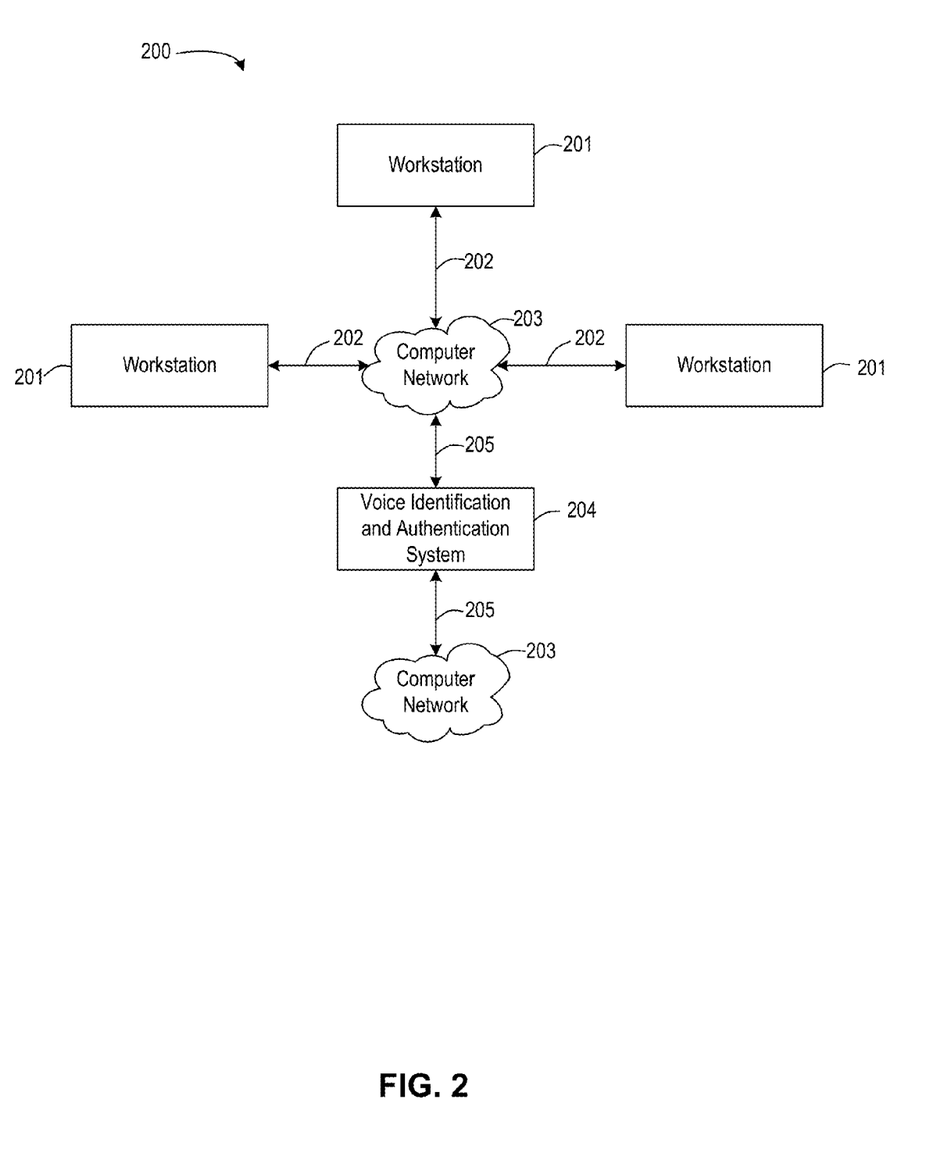
FIG. 2 is a block diagram of example workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the voice identification and verification system 204. In certain embodiments, workstations 201 may be different servers that communicate with the voice identification and verification system 204, or, in other embodiments, workstations 201 may be different points at which the voice identification and verification system 204 may be accessed. In system 200, the voice identification and verification system 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the voice identification and verification system 204, such as network links, dial-up links, wireless links, hard-wired links, and the like.

The disclosure that follows may be implemented by one or more of the components in FIG. 1 and FIG. 2 and/or other components, including other computing devices.

Figure 3:
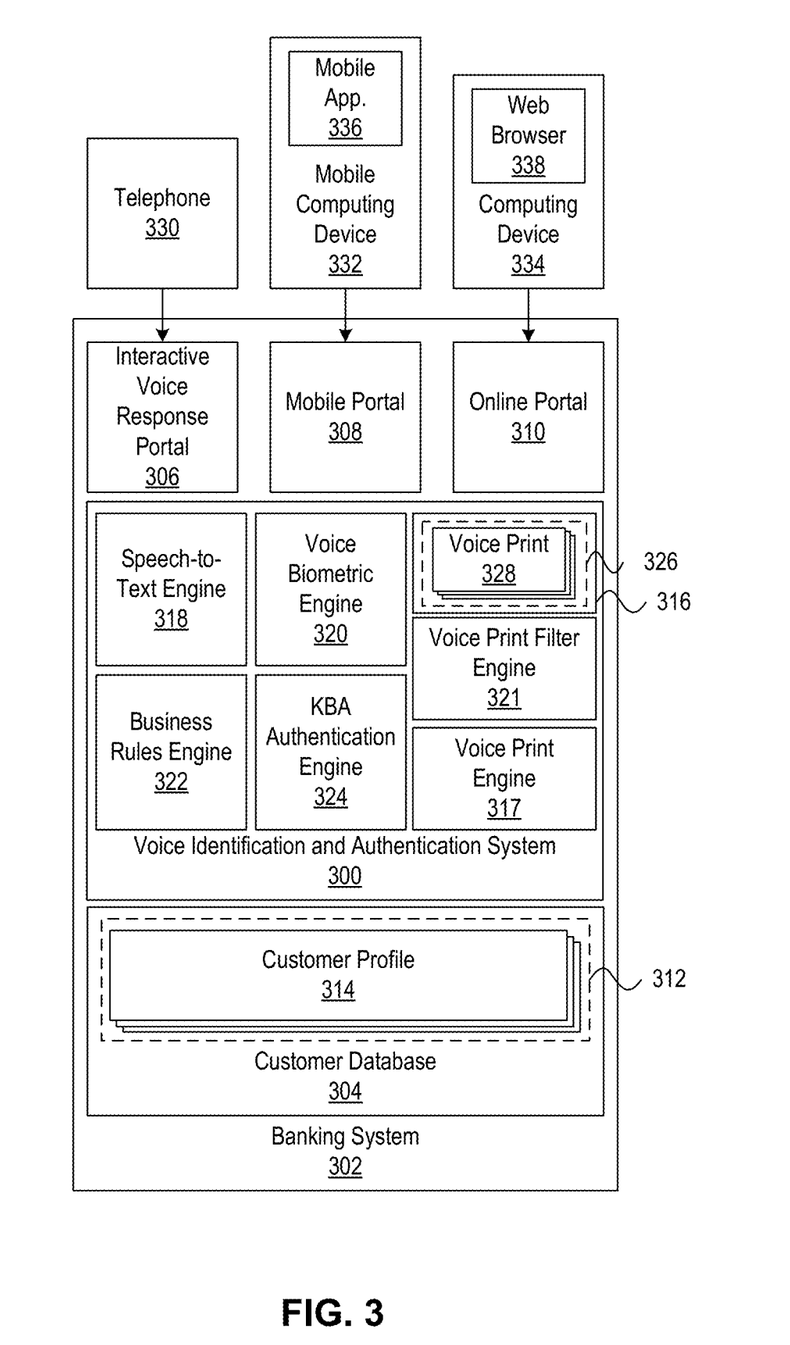
FIG. 3 is a block diagram of an example of an implementation of a voice identification and verification system

Referring now to FIG. 3, a block diagram of an example of an implementation of a voice identification and authentication system 300 (which may also be referred to as "voice system" 300 herein) is shown. The voice system 300 may be a component of a banking system 302. The banking system 302, in this example, includes a customer database 304 and various communication portals 306-310 that provide access to the banking system. The communication portals 306-310 of the banking system 302 serve as entry points into the banking system to receive communications from a remote location. The banking system 302, in this example, also includes different types of communication portals to allow individuals to access the banking system using different types of devices. The banking system 302, in this example, includes an interactive voice response (IVR) portal 306, a mobile portal 308, and an online portal 310. The banking system 302 may include additional components that have been omitted from FIG. 3 for the purpose of clarity.

The customer database 304 of the banking system 302, in this example, stores a set 312 of customer profiles 314. The customer profiles 314, in this example, include customer information relating to a bank customer. Customer information may include, for example, the name of the bank customer, contact information for the bank customer, and account information for the bank customer. Customer information may also include information that the banking system 302 may utilize to determine the identity or authenticate an individual such as answers to security questions, phone numbers or network address from which the individual has previously contacted the banking system, device identification numbers of devices the individual has previously used to contact the banking system, and other types of information that may be utilized to identify or authenticate an individual. Customer information may include other types of information related to bank customers.

The voice identification and authentication system 300, in this example, includes: a voice print database 316; a voice print engine 317; a speech-to-text engine 318; a voice biometric engine 320; a filtering engine 321; a business rules engine 322; and a knowledge-based authentication (KBA) engine 324. The voice print database 316, in this example, includes a set 326 of one or more voice prints 328. The voice prints 328, in this example, are recordings of a key phrase recorded by bank customers, e.g., during an enrollment process. Accordingly, each voice print 328 is respectively associated with a customer profile 314 in the customer database 304. The key phrase, in this example, includes the full name (first name and last name) of the customer. As described in further detail below, the voice system 300 utilizes the name of the customer in order to determine the identity of an individual. A key phrase may also be referred to, in some instances, as a passphrase.

The IVR portal 306 provides access to the banking system 302 via a phone call received from a telephone 330. The IVR portal 306 may route the phone call and provide access to banking services in response to voice commands provided by the individual over the telephone 330. The telephone 330 may be, e.g., a landline telephone that access the IVR portal through a public switched telephone network (PSTN) or may be a mobile telephone that accesses the IVR portal through a cellular network.

The mobile portal 308 provides access to the banking system 302 via a communication session with a mobile computing device 332. Communications used to access to the banking system 302 through the online portal 308 may be referred to as "mobile communications" in this description. In some example implementations, mobile communications may include HyperText Transfer Protocol (HTTP) requests. The mobile portal 308 may provide access to banking services via a mobile application 336 (which may be referred to as a "mobile app" or "app") installed at the mobile computing device 332. Accordingly, the mobile computing device 332 may be, e.g., a smartphone, a palmtop computer, a tablet computer, and other types of mobile computing devices configured to run mobile applications. The mobile application 336 may thus be in communication with the mobile portal 308 through a wireless networks (e.g., a cellular network), wired networks (e.g., the Internet), or a combination of wired or wireless networks.

The online portal 310 provides access to the banking system 302 via a communication session with a computing device 334. Communications used to access to the banking system 302 through the online portal 310 are referred to as online communications in this description. In some example implementations, mobile communications may include HTTP requests. The online portal 310 may provide access to the banking system 302 over the Internet and may thus include one or more web pages and web services. Accordingly, the computing device 334 may be in communication with the online portal 310 via a web browser 338 at the computing device. The computing device 334 may thus be, e.g., a desktop computer, a laptop computer, a tablet computer, a palmtop computer, a smartphone, and any other computing device capable of web access.

The portals 306-310 prompt individuals to speak the key phrase that includes their full name. In response, the portals 306-310 receive the spoken key phrase from the customer and pass the key phrase audio to the voice system 300 for analysis. When calling from the telephone 330, an individual may speak the key phrase into the receiver of the telephone, and the key phrase audio is transmitted to the IVR portal 306. When using a mobile application 336 or web browser 338 at a computing device 332 or 334, an individual may speak the key phrase into a microphone of the computing device, and the key phrase audio is uploaded to the mobile portal 308 or online portal 310. Accordingly, the banking system may receive the spoken key phrase in an analog format or a digital format depending on the portal that the individual uses to access the banking system.

The voice print engine 317 is configured to generate a voice print as output when provided voice audio as input. The voice print 328 may be, for example, a string of alphabetic and numeric characters. Accordingly, the voice print engine 317 may be configured to generate the string of alphabetic and numeric characters as output when provided voice audio as input. During an enrollment process, a banking institution may ask a customer to speak the key phrase and provide the audio to the voice print engine 317 in order to obtain a voice print 328 of the key phrase for the customer. The voice print 328 for the customer may then be stored in the voice print database 316 and associated with the customer profile 314 for the customer. When the customer subsequently attempts to access the banking system, the customer may be prompted to speak the key phrase again, and the voice print engine 317 may receive the spoken key phrase and generate a voice print for the spoken key phrase (which may be referred to as a "key phrase voice print"). The key phrase voice print may then be compared to one or more of the voice prints 328 stored in the voice print database 316.

The speech-to-text engine 318 may be a commercially available automatic speech recognition (ASR) system. The voice system 300 utilizes the speech-to-text engine 318 to convert the key phrase audio into key phrase text. The key phrase text thus includes the name of the individual in text form. The speech-to-text engine 318 may extract the name of the individual from the key phrase text. Because the extracted name is in text form, the voice print database may be queried with the extracted name to obtain one or more voice prints respectively associated with customers having that name.

The voice biometric engine 320 may be a commercially available biometric voice verification system. The voice biometric engine 320 is configured to compare the voice print of a spoken key phrase to a voice print of a previous recording of the key phrase and determine whether the voice prints match. If the voice prints match, then the voice biometric engine 320 may conclude that the individual that provided the spoken key phrase is the same individual that provided the previous recording of the key phrase. The voice biometric engine 320 provides a confidence score quantifying the likelihood that the same individual provided both the spoken key phrase and the previously recorded key phrase. A relatively high confidence score may indicate a relatively high likelihood that the same individual provided both the spoken key phrase and the previously recorded key phrase. A relatively low confidence score may indicate a relatively low likelihood that the same individual provided both the spoken key phrase and the previously recorded key phrase. Stated differently, a relatively low confidence score may indicate that one individual provided the spoken key phrase and a different individual provided the previously recorded key phrase. The voice biometric engine 320 may be configured for one-to-one voice print comparisons in which one voice print is compared with another voice print and, based on this comparison, one confidence score is generated for the comparison performed. The voice biometric engine 320 may also be configured for one-to-many voice print comparisons in which one voice print is compared to each voice print in a collection of multiple voice prints. For a one-to-many voice print comparison, the voice biometric engine 320 may generate a collection of multiple confidence scores for each respective comparison performed.

The filtering engine 321 filters a collection of voice prints 328 before the collection of voice prints is provided to the voice biometric engine 320. When the filtering engine 321 filters the collection of voice prints 328, the filtering engine may remove one or more voice prints from the collection such that the voice biometric engine does not compare the key phrase voice print to the voice prints removed from the collection. The voice system 300 may utilize the filtering engine 321 when the total number of voice prints to be provided to the voice biometric engine 320 exceeds a predetermined size threshold. The predetermined size threshold may be selected based on the capability of the voice biometric engine to perform the comparisons within a desired response time. Some voice biometric engines may be able to compare a key phrase voice print to 20,000 voice prints in about 0.5 seconds (s) to about 1 second. Accordingly, in some example implementations the predetermined size threshold may be around 20,000.

The filtering engine 321 may filter a collection of voice prints based on a variety of criteria. In some example implementations, the filtering engine 321 may filter a collection of voice prints 328 based on a characteristic of the communication that provided the spoken key phrase. As noted above, a communication may be a phone call, a mobile communication or an online communication and may therefore be respectively associated with a phone number, network address, or device identifier, which may, for instance, be considered characteristics of the communication that provided the spoken key phrase. As also noted above, the customer database 304 may store customer information indicating previous communications received with respect to a customer profile 314 and information related to those previous communications, e.g., phone numbers, network addresses, or device identifiers. Through an association with a customer profile 314, a stored voice print 328 may also be associated with the previous communications received with respect to that customer profile. Accordingly, in filtering the collection of voice prints 328 based on one or more characteristics, the filtering engine 321 may compare the phone number, network address, or device identifier associated with a current communication to the phone number, network address, or device identifier associated with a previous communication. As described in further detail below, the filtering engine 321 may perform such comparisons to determine whether to remove a voice print 328 from the collection of voice prints provided to the voice biometric engine 320 for comparison. It will be appreciated that the characteristics of current and previous communications represent just one type of criteria the filtering engine 321 may utilize to filter a collection of voice prints 328. Additional and alternative criteria may be selectively employed to filter a collection of voice prints 328.

The business rules engine 322 applies various business rules related to the identification and authentication of an individual. The business rules engine 322 may, for example, compare the confidence score to a confidence threshold in order to determine whether or not to authenticate the individual. The business rules engine 322 may also determine whether to perform additional verification steps based on a comparison of the confidence score to a confidence threshold. The business rules engine 322 may also apply various business rules to direct a call or communication once an individual has been authenticated, e.g., in order to provide requested bank services.

The KBA authentication engine 324 may be used to perform further authentication of the identity of the individual. The KBA authentication engine 324 may query the customer database 304 for security questions associated with a customer profile 314 and issue challenges to an individual attempting to access the banking system 302 through one of the portals 306-310. The KBA challenges may prompt the user to provide an answer to a security question. The KBA authentication engine 324 may authenticate or reject the identity of an individual depending on the number of KBA challenges answered correctly. The KBA authentication engine 324 may also communicate the number of KBA challenges answered correctly or incorrectly to the business rules engine 322, which may determine how to route or handle the phone call or communication session. Security questions posed by the KBA authentication engine 324 may be based on static KBA information (e.g., "What street did you grow up on?") or dynamic KBA information (e.g., "Which restaurant did you eat at within the last week?").

If the identity of an individual is authenticated, then that individual may be granted access to associated bank accounts and other banking services. Identification and verification of an individual are described in further detail below.

Figure 4:
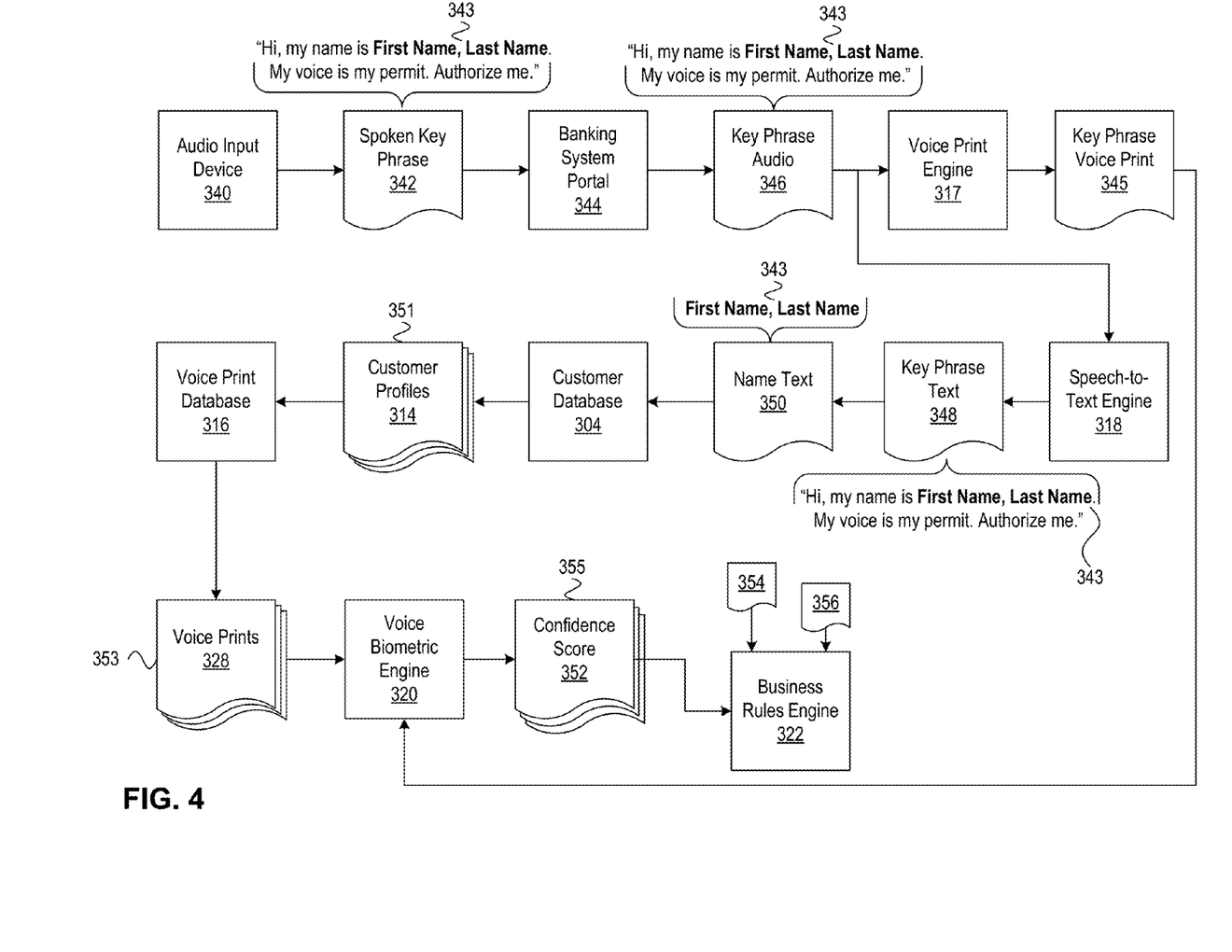
FIG. 4 is a block diagram of an example of a workflow corresponding to determining the identity of an individual.

Referring now to FIG. 4, a block diagram of an example of a workflow corresponding to determining the identity of an individual is shown. As seen in FIG. 4, an audio input device 340 may receive a spoken key phrase 342 and provide the spoken key phrase to a banking system portal 344. The audio input device 342 may be, e.g., the receiver of a telephone or the microphone of a computing device as described above. The spoken key phrase 342, in this example, includes the name 343 of the individual in order to identify customer profiles having a matching name as also described above. The banking system portal 344 may be, e.g., one of the IVR portal 306, mobile portal 308, or online portal 310 described with reference to FIG. 3.

The banking system portal 344 may receive the spoken key phrase 342 and pass the spoken key phrase as key phrase audio 346 to the voice print engine 317 and to the speech-to-text engine 318. The key phrase audio 346 may likewise include the name 343 of the individual. In turn, the voice print engine 317 may generate a key phrase voice print 345 based on the key phrase audio 346. The key phrase voice print 345 is the voice print that will be compared to voice prints 328 stored in the voice print database 316. Additionally, the speech-to-text engine 318 may convert the key phrase audio 346 into key phrase text 348. The key phrase text 348 may thus include the name 343 of the individual in text form. Because the same key phrase is used for all individuals—the only difference being the name of the individual—the speech-to-text engine 318 may remove the common elements of the key phrase (e.g., "Hi, my name is . . . My voice is my permit. Verify me.") leaving only text 350 consisting of the name 343 of the individual.

The name text 350 may be used to query the customer database 304 for customer profiles 314 wherein the customer name of the customer profile matches the name text 350 extracted from the key phrase text 348. The voice system 300 may be configured to take into account variant spellings of a name. Accordingly, the customer database 304 may be queried multiple times with variant spellings of the name in the name text 350 or, additionally or alternatively, a single query to the customer database may include the variant spellings of the first name or last name in the alternative, e.g., (First_Name_1 OR First_Name_2) AND (Last_Name_1 OR Last_Name_2). Accordingly, matching names, as used in this description, may be names having the same spelling or names that have phonetically similar spellings.

A result set 351 of customer profiles 314 may be obtained from the customer database 304 and used to query the voice print database 316 for stored voice prints 316 respectively associated with the customer profiles of the result set. A result set 353 of voice prints 328 may in turn be obtained from the voice print database 316. The result set 353 of voice prints 328 and the key phrase voice print 345 may be provided to the voice biometric engine 320 for comparison. The voice biometric engine 320 may compare the key phrase voice print 345 to each voice print 328 in the result set 353 of voice prints.

The voice biometric engine 320 may produce as output a set 355 of confidence scores 352. As indicated above, the confidence scores 352 quantify the likelihood that the same individual provided both the spoken key phrase 342 as well as speech corresponding to a particular voice print 328. In other words, the confidence score may indicate the extent to which a voice print corresponding to the spoken key phrase matches a voice print corresponding to a previously spoken key phrase. In some example implementations, the confidence scores may range from zero to one hundred. In this example, a confidence score of zero indicates a 0% likelihood that the same individual provided both the spoken key phrase 342 and speech corresponding to a particular voice print 328, and a confidence score of one hundred indicates a 100% likelihood the same individual provided both the spoken key phrase and speech corresponding to the particular voice print. The set 355 of confidence scores 352 may in turn be provided to the business rules engine 322 for further analysis.

The business rules engine 322 may determine which confidence score 352 in the set 355 of confidence scores is the highest confidence score. The business rules engine may then compare the highest confidence score 352 to one or more confidence thresholds, e.g., an upper confidence threshold 354 and a lower confidence threshold 356, in order to determine whether or not to authenticate the individual. In some example implementations, the business rules engine 322 may authenticate the individual when the highest confidence score 352 is above the upper confidence threshold 354 (e.g., ninety-five) and might not authenticate the individual when the highest confidence score is below the lower confidence threshold 356 (e.g., seventy-five). When the highest confidence score 352 of the set 355 of confidence scores is between the upper confidence threshold 354 and the lower confidence threshold 356, the business rules engine 322 may initiate additional identity verification procedures through the KBA authentication engine 324.

In some implementations, the result set 353 of voice prints 328 may be further narrowed to further improve the response time of the voice biometric engine 320. The voice system 300 may further narrow the result set 353 of voice prints 328 if the result set of voice prints is still too large for the voice biometric engine 320 to analyze within a desired response time. It will be recognized, for example, that when the name included in the key phrase is a common name, a customer database 304 storing millions of customer records may yield a result set 353 of voice prints 328 having tens of thousands of voice prints. Accordingly, the voice system 300 may further filter the result set 353 of voice prints 328 such that the voice biometric engine 320 may provide the set 355 of confidence scores 352 within a desired response time.

The voice system 300 may filter the result set 353 of voice prints 328 based on information associated with the communication from the individual. Such information may include, for example, the phone number from which the call originated, the network address of a device the individual is communicating from, or the device identifier of the device the individual is communicating from. As mentioned above, customer information may include information indicating phone numbers an individual has previously called from. The banking system may employ automatic number identification (ANI) to identify the phone numbers of incoming calls. The banking system may store those phone numbers, e.g., in the customer database 304, and associate the phone numbers with the customer that initiated the call. The banking system may similarly store network addresses, such as Internet Protocol (IP) addresses, as well as device identifiers, such as machine access control (MAC) addresses, in the customer database 304.

When an individual contacts the banking system through the IVR portal, the voice system 300 may filter the result set 353 of voice prints 328 based on the phone number the individual is calling from. In particular, the voice system 300 may retain in the result set 353 voice prints associated with customer profiles that include a previous phone number matching the current phone number and remove other voice prints from the result set. When an individual contacts the banking system through a mobile portal or an online portal, the voice system 300 may similarly retain and remove voice prints based on whether a previous network address or previous device identifier matches the current network address or the current device identifier. In this way, the voice system may further narrow the number of voice prints to be compared at the voice biometric system such that the voice biometric system can perform the comparisons within a desired response time.

In view of the approach described above, it will be appreciated that the identity of an individual is first determined in order to obtain voice prints for comparison. Simply comparing voice input to every voice print available is not a feasible approach where the pool of voice prints is relatively large and a relatively fast response time is desired.

Banking institutions, for example, may store voice prints for hundreds of thousands of customers, and remote access to banking services may dictate a response time on a scale of seconds. Despite advances in voice biometric technology, comparing voice input from an individual to every voice print available may be prohibitively expensive from a computation standpoint—in particular when a banking system may field multiple remote service requests per second. The response time for such an approach may be on a scale of minutes and therefore might not be suitable for situations where it is desirable to determine the identity of an individual in a matter of seconds.

In order to determine the identity of an individual based on the voice of that individual in a matter of seconds the approach set forth above narrows down the pool of voice prints for comparison. With a smaller pool of voice prints to compare, the voice biometric engine may compare the voice prints in a timeframe (e.g., about 0.5 s to about 1 s) that does not impact the user experience. The approach set forth above narrows down the pool of voice print for comparison based on an identifier (e.g., the name of the individual) included in a key phrase spoken by that individual.

Moreover, the name of the individual is just one example of an identifier that may be spoken by an individual and used to identify the individual. It will be appreciated that the key phrase may be configured to include other types of identifiers that uniquely identify an individual. The voice system may thus be selectively configured to identify an individual based on additional or alternative types of identifiers. Accordingly, the voice system may include voice prints for multiple key phrases spoken by an individual, with each key phrase including a different type of identifier. The voice system may thus be configured to identify the type of identifier included in the key phrase provided by the individual and query a voice database for voice prints of previously spoken key phrases that include the same type of identifier. The name of the individual is provided as an example in the present disclosure as this information is readily available to an individual.

Figure 5:
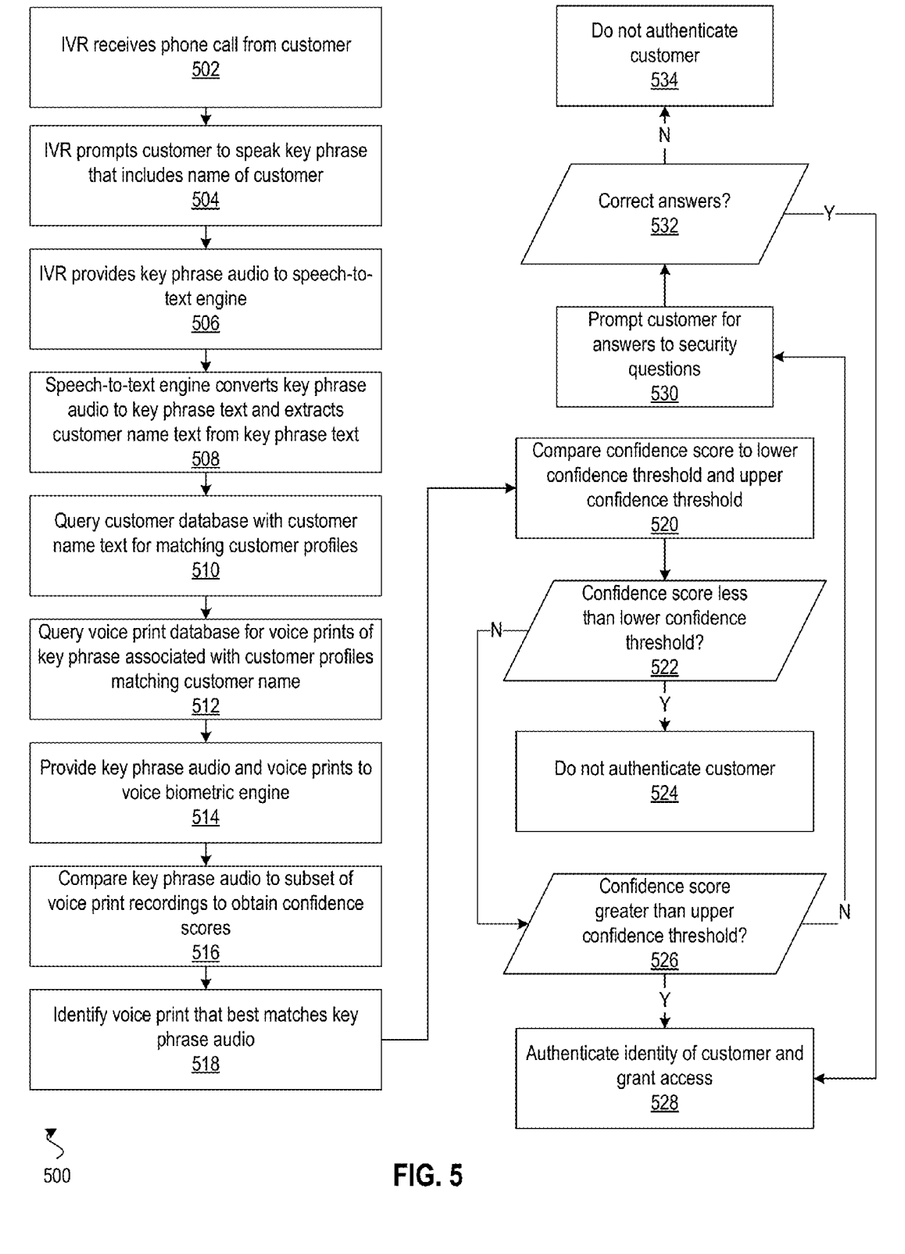
FIG. 5 is a flowchart of example method steps for determining the identity of an individual and authenticating the identity of the individual.

In FIG. 5, a flowchart 500 of example method steps for determining the identity of an individual and authenticating the identity of that individual. The steps shown in FIG. 5 may be employed to identify and authenticate an individual that contacts the banking system via telephone through an IVR portal. Various steps set forth below, however, may also be employed to identify and authenticate an individual contacting the banking system via a mobile computing device through the mobile platform or via a computing device through the online platform.

As seen in FIG. 5, an IVR portal of a banking system may receive a phone call from a customer (block 502). During the call, the IVR portal prompts the customer to speak the key phrase (block 504). As noted above, the key phrase includes an identifier that identifies the customer, e.g., the full name of the customer. The IVR engine provides key phrase audio to a speech-to-text engine (block 506) where the key phrase audio corresponds to the spoken key phrase received from the customer. The speech-to-text engine converts the key phrase audio into key phrase text and extracts the identifier (e.g., the customer name) from the key phrase text (block 508). Having obtained the customer name from the spoken key phrase, the determination of the identity of the individual is thus complete. The voice system may then verify the identity of the individual to ensure the individual has provided accurate identification information.

The customer database of the banking system may be queried with the customer name text to obtain a result set of customer profiles where the customer name in the customer profile matches the customer name text extracted from the key phrase audio (block 510). It will be recognized that a customer database may include multiple customer profiles where the name in the customer profile matches the customer name text. Therefore, the result set of customer profiles may include multiple customer profiles. The voice print database may then be queried to obtain voice prints respectively associated with the customer profiles in the result set of customer profiles (block 512). As noted above, a banking system may have a customer record the key phrase during an enrollment process, and the recorded key phrase may be stored as a voice print for the customer and associated with the customer profile of the customer. The result set of voice prints from the voice print database may likewise include multiple voice prints.

The key phrase audio and the result set of voice prints are provided to the voice biometric engine for comparison (block 514). The voice biometric engine compares the key phrase audio to one or more of the voice prints in the result set of voice prints (block 516). The voice biometric engine may thus obtain respective confidence scores for each comparison. As described above, the confidence score quantifies the likelihood that the individual that provided the key phrase audio also provided the previously recorded voice print. Having obtained the confidence scores for the voice print comparisons, the business rules engine may determine which voice print in the result set of voice prints best matches the key phrase voice print (block 518). The voice print that best matches the key phrase voice print may be, e.g., the voice print resulting in the highest confidence score.

It will be appreciated, however, that even though a voice print has the highest confidence score in a result set of voice prints, the confidence score may not be high enough to justify authenticating the individual. Accordingly, the confidence score for the best matching voice print may be compared to a lower confidence threshold and an upper confidence threshold (block 520). If the confidence score is less than the lower confidence threshold (block 522:Y), then the business rules engine may determine to not authenticate the customer (block 524). If, however, the confidence score is greater than the lower confidence threshold (block 522:N) and the confidence score is greater than the upper confidence threshold (block 526:Y), then the business rules engine may authenticate the customer (block 528). If the confidence score is greater than the upper confidence threshold, then it will be appreciated that the voice system has both identified the individual and authenticated the individual since the stored voice print matches the key phrase voice print for the key phrase spoken by the individual.

In some situations, the confidence score may be greater than the lower confidence threshold (block 522:N) but less than the upper confidence threshold (block 526:N). In these situations, the voice system may perform additional steps in an attempt to verify the identity of the customer. The voice system may, for example, use the KBA engine to prompt the customer for answers to one or more security questions (block 530). The KBA engine may retrieve answers to the security questions from the customer profile associated with the voice print that best matches the key phrase voice print. The business rules engine may determine whether to authenticate the customer based on a total number of security questions answered correctly. If the customer cannot provide correct answers to the security questions (block 532:N), then the voice system might not authenticate the customer (block 534). If, however, the customer can provide correct answers to the security questions (block 532:Y), then the voice system may authenticate the identity of the customer and grant the customer access to the system. (block 528). In some example implementations, the KBA engine of the voice system may challenge the customer with multiple security questions before authenticating the identity of the customer, and may be flexible by allowing the customer to provide more than one wrong answer before determining not to authenticate the identity of the customer. Accordingly, the business rules engine may, in some example implementations, determine whether to authenticate the customer based on the total number of correct answers provided relative to the total number of incorrect answers provided—in other words, the percentage of correct answers provided. Once the identity of the customer is authenticated, the customer may be granted access to the banking system and granted access to requested banking services.

Figure 6:
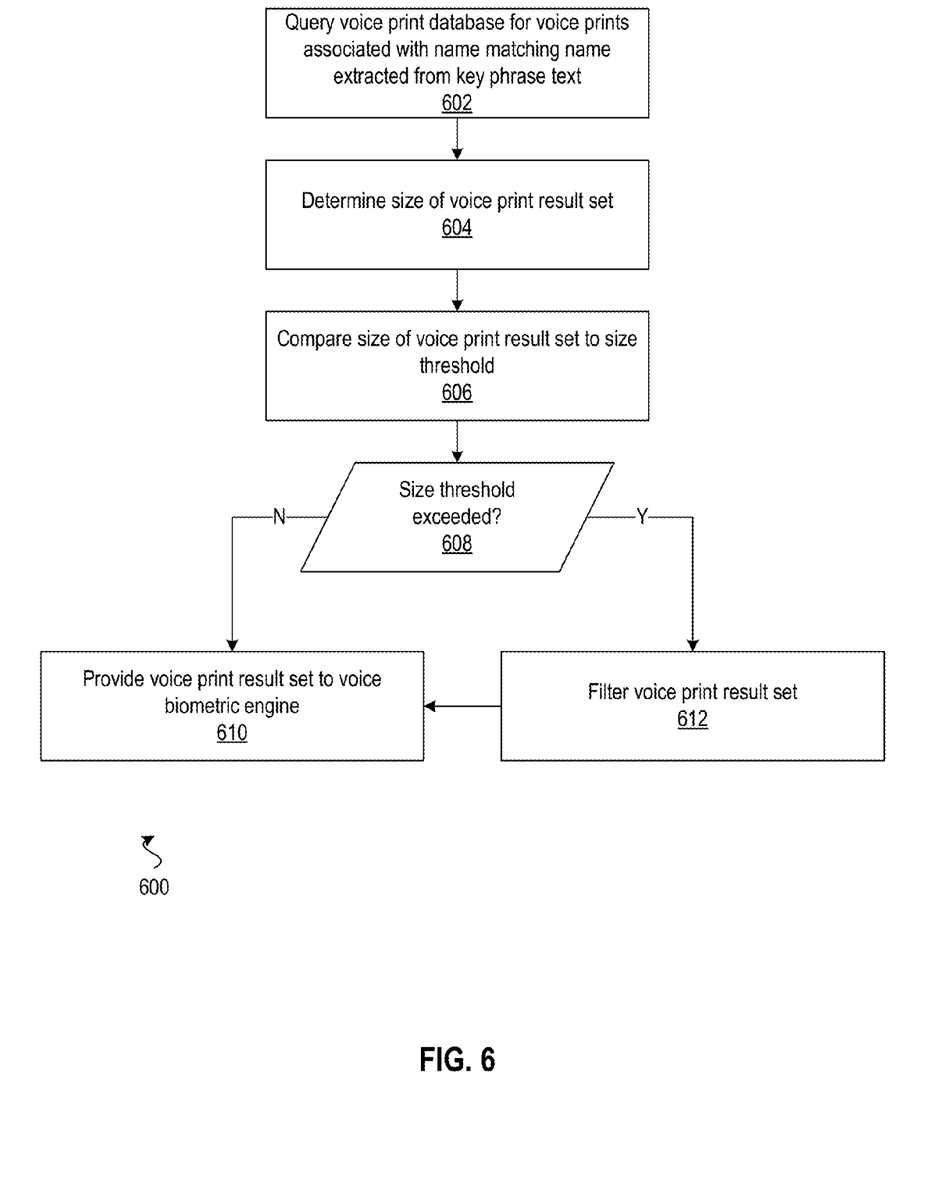
FIG. 6 is a flowchart of example method steps for determining whether to filter a set of voice prints.

FIG. 6 is a flowchart 600 of example method steps for determining whether to filter a set of voice prints before providing the set of voice prints to the voice biometric engine. As seen in FIG. 6 and as described above, a voice print database may be queried for voice prints associated with a name that matches a name extracted from key phrase text (block 602). The business rules engine may determine the size of the voice print result set (block 604) and may compare the size of the result set to a size threshold (block 606). If the size of the voice print result set does not exceed the size threshold (block 608:N), then the set of voice prints may be provided to the voice print database for comparison to the key phrase voice print (block 610). If, however, the size of the voice print result set does exceed the size threshold (block 608:Y), then the voice print result set may be provided to the filtering engine, and the filtering engine may filter the result set (block 612). Once the filtering engine completes the filtering of the voice print result set, the voice print result set may be provided to the voice biometric engine (block 610) for comparison to the key phrase voice print.

Figure 7:
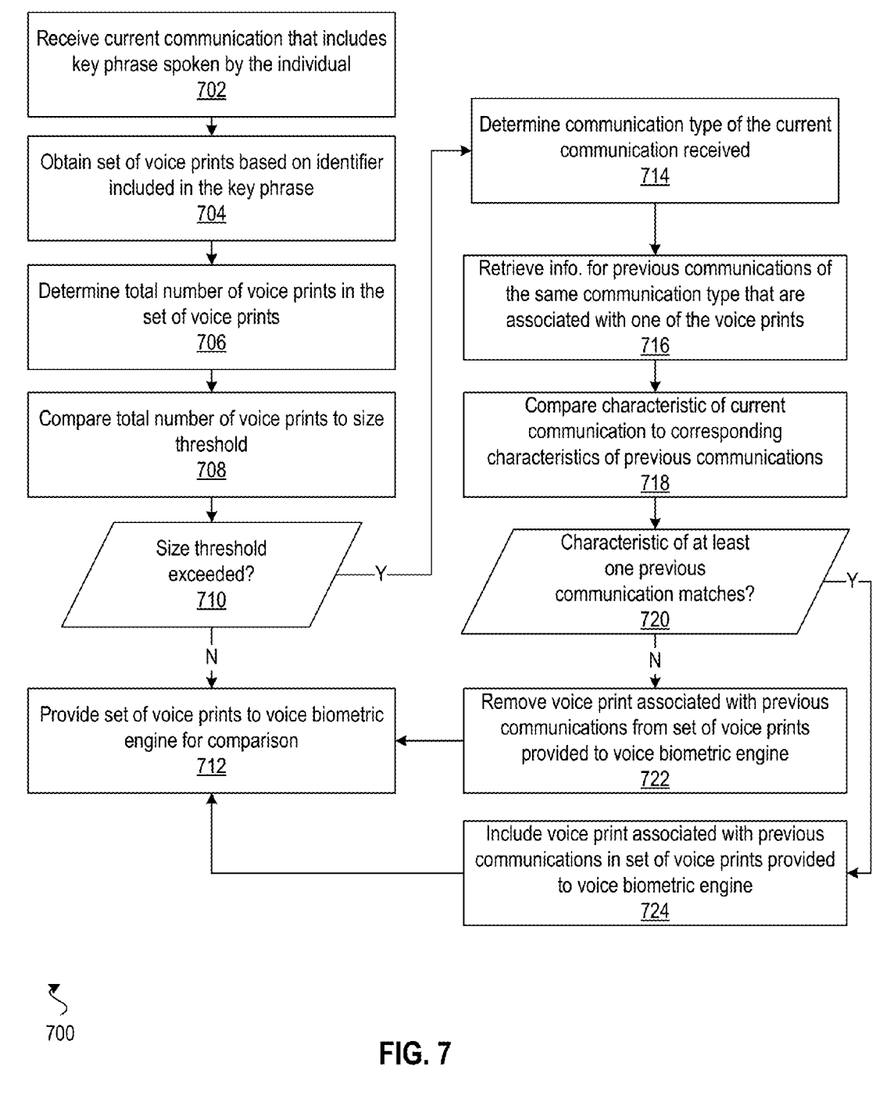
FIG. 7 is a flowchart of example method steps for filtering a set of voice prints.

As described above, the filtering engine may filter the voice print result set based on various criteria. FIG. 7 is a flowchart 700 of example method steps for filtering a set of voice prints. In this example, the voice print result set is filtered based on a characteristic of the current communication that provided the spoken key phrase. Accordingly, the characteristic of the current communication may be compared to a corresponding characteristic of one or more previous communications respectively associated with the voice prints in the voice print result set. As seen in FIG. 7, a current communication may be received that includes a key phrase spoken by an individual (block 702), and that key phrase may include an identifier such as the name of the individual. A set of voice prints may be obtained based on the identifier included in the key phrase (block 704). For example, a voice print database may be queried to obtain voice prints that are associated with customer profiles having a name that matches the name included in the key phrase. A business rules engine may determine the total number of voice prints in the set of voice prints (block 706) and compare the total number of voice prints to a size threshold (block 708). If the total number of voice prints in the set of voice prints does not exceed the size threshold (block 710:N), then the set of voice prints may be provided to the voice biometric engine for comparison to the key phrase voice print (block 712) as described above.

If, however, the total number of voice prints in the set of voice prints exceeds the size threshold (block 710:Y), then the filtering engine may determine the communication type of the current communication (block 714), e.g., a phone, mobile, or online communication. For one of the voice prints, the filtering engine may then retrieve information related to previous communications of the same communication type that are associated with that voice print (block 716). As an example, if the current communication is a phone call, then the filtering engine may retrieve information related to previous phone calls that are associated with the customer profile the voice print is associated with. As another example, if the current communication is an online communication, then the filtering engine may retrieve information related to previous online communications that are associated with the customer profile the voice print is associated with.

The filtering engine may then compare the characteristic of the current communication to the corresponding characteristics of the previous communications (block 718). If the characteristic of at least one of the previous communications matches the characteristic of the current communication (block 720:Y), then the individual that initiated the previous communication may potentially be the individual that initiated the current communication. Accordingly, the filtering engine may include the voice print associated with that previous communication in the set of voice provided to the voice biometric engine (block 724) for comparison to the key phrase voice print and to determine whether the individuals that respectively provided the current and previous communication are the same individual. If, however, the characteristic of at least one of the previous communications does not match the characteristic of the current communication (block 720:N), then it may be unlikely that the individual that initiated the previous communication also initiated the current communication. Accordingly, the filtering engine may remove the voice print associated with those previous communications from the set of voice prints provided to the voice biometric engine (block 722). The filtered set of voice prints may then be provided to the voice biometric engine for comparison to the key phrase voice print (block 712).

As mentioned above, the information related to the previous communications may include a phone number, network address, or device identifier. Accordingly, a phone number, network address, or device identifier of a current communication may be considered characteristics of a communication and may be compared to corresponding phone number, network address, or device identifier of previous communications. It will be appreciated, however, that additional or alternative characteristics associated with the communications may be selectively employed to filter a set of voice prints provided to the voice biometric engine. It will also be appreciated that additional and alternative types of criteria may be selectively employed to filter a set of voice prints provided to the voice biometric engine.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method for determining an identity of an individual comprising:
    receiving audio that includes a key phrase spoken by the individual and the key phrase includes an identifier spoken by the individual;
    obtaining a key phrase voice print corresponding to the audio;
    obtaining key phrase text corresponding to the audio wherein the key phrase text includes text corresponding to the identifier spoken by the individual;
    retrieving a set of voice prints based on the text corresponding to the identifier;
    determining that a total number of voice prints in the set of voice prints exceeds a predetermined size threshold;
    selecting at least one of the voice prints in the set of voice prints to exclude from comparison to the key phrase voice print; and
    providing the key phrase voice print and one or more voice prints in the set of voice prints, other than the at least one voice print selected for exclusion, to a voice biometric engine for comparison.

2. The method of claim 1 wherein:
    the identifier comprises a first name and a last name of the individual; and
    each of the one or more voice prints retrieved is respectively associated with a customer profile that includes a profile first name that matches the first name and a profile last name that matches the last name.

3. The method of claim 1 wherein:
    the key phrase voice print is obtained from a voice print engine that receives the audio;
    the key phrase text is obtained from a speech-to-text engine that receives the audio; and
    the one or more voice prints are retrieved from a voice print database that stores the one or more voice prints.

4. The method of claim 1 wherein the audio is received via one of an interactive voice response portal, a mobile portal, and an online portal.

5. The method of claim 1 wherein:
    the audio is received in a current communication from the individual;
    the at least one voice print selected for exclusion is associated with at least one previous communication; and
    the at least one voice print selected for exclusion is selected responsive to a determination that a current characteristic of the current communication does not match a previous characteristic of the at least one previous communication.

6. The method of claim 5 wherein the current characteristic and the previous characteristic are one of:
    a current phone number associated with the current communication and a previous phone number associated with the at least one previous communication respectively;
    a current network address associated with the current communication and a previous network address associated with the previous communication respectively; and
    a current device identifier associated with the current communication and a previous device identifier associated with the previous communication respectively.

7. A system for determining an identity of an individual comprising:
    at least one processor; and
    memory storing computer readable instructions that, when executed by the at least one processor, cause the system to provide
        a communication portal that is configured to receive a communication that includes audio, wherein the audio includes a key phrase spoken by the individual and the key phrase includes an identifier spoken by the individual,
        a voice print engine that is configured to obtain a key phrase voice print corresponding to the audio,
        a speech-to-text engine that is configured to obtain key phrase text corresponding to the audio wherein the key phrase text includes text corresponding to the identifier spoken by the individual, a voice print database that is configured to provide a set of voice prints based on the text corresponding to the identifier, and a filter engine that is configured to select at least one of the voice prints in the set of voice prints to exclude from comparison to the key phrase voice print responsive to determining that a total number of voice prints in the set of voice prints exceeds a predetermined size threshold;

wherein the key phrase voice print and the set of voice prints, other than the at least one voice print selected for exclusion, are made available to a voice biometric engine for comparison.

8. The system of claim 7 wherein:

the identifier comprises a first name and a last name of the individual; and each voice print of the set of voice prints provided by the voice print database is respectively associated with a customer profile that includes a profile first name that matches the first name and a profile last name that matches the last name.

9. The system of claim 7 wherein the memory stores additional computer readable instructions that, when executed by the at least one processor, further cause the system to provide:

a voice biometric engine that is configured to compare the key phrase voice print to individual voice prints in the set of voice prints;

wherein the voice biometric engine provides a set of confidence scores and individual confidence scores in the set of confidence scores respectively indicate the extent to which the key phrase voice print matches individual voice prints in the set of voice prints.

10. The system of claim 9 wherein the memory stores additional computer readable instructions that, when executed by the at least one processor, further cause the system to provide:

a business rules engine that is configured to determine which confidence score in the set of confidence scores is the highest confidence score and is further configured to determine whether to authenticate the individual based, at least in part, on the highest confidence score;

wherein the business rules engine authenticates the individual when the highest confidence score is greater than an upper confidence threshold, and wherein the business rules engine does not authenticate the individual when the highest confidence score is lower than a lower confidence threshold.

11. The system of claim 10 wherein the memory stores additional computer readable instructions that, when executed by the at least one processor, further cause the system to provide:

an authentication engine that is configured to prompt the individual to answer one or more security questions when the highest confidence score in the set of confidence scores is less than the upper confidence threshold and greater than the lower confidence threshold, and wherein the business rules engine determines whether to authenticate the individual further based on a total number of security questions correctly answered by the individual.

12. The system of claim 7 wherein:

the communication is a current communication and the voice print selected for exclusion is associated with at least one previous communication, and the filter engine selects the at least one voice print for removal responsive to a determination that a current characteristic of the current communication does not match a previous characteristic of the at least one previous communication.

13. The system of claim 12 wherein the current characteristic and the previous characteristic are one of:

a current phone number associated with the current communication and a previous phone number associated with the at least one previous communication respectively;

a current network address associated with the current communication and a previous network address associated with the previous communication respectively; and a current device identifier associated with the current communication and a previous device identifier associated with the previous communication respectively.

14. One or more non-transitory computer-readable media having instructions for identifying and authenticating an individual that, when executed at a processor, cause a computing device to:

receive audio that includes a name of the individual;

obtain a current voice print that corresponds to the audio;

convert the audio to text;

extract the name of the individual from the text;

query a voice print database with the name of the individual to obtain a set of stored voice prints associated with the name of the individual;

determining that a total number of stored voice prints in the set of stored voice prints exceeds a predetermined size threshold;

select at least one of the voice prints in the set of voice prints to exclude from comparison to the current voice print compare the current voice print to one or more of the stored voice prints in the set of voice prints, other than the at least one voice print selected for exclusion, to obtain one or more confidence scores;

authenticate the individual when one of the confidence scores is greater than a predetermined upper threshold; and grant the individual access to one or more services provided by a banking system when the individual is authenticated.

15. The computer-readable media of claim 14 wherein:

the current voice print is obtained from a voice print engine that receives the audio;

a speech-to-text engine converts the audio to the text; and a voice print engine compares the current voice print to one or more of the stored voice prints.

16. The computer-readable media of claim 15 wherein the audio is received via one of an interactive voice response portal, a mobile portal, and an online portal.

17. The computer-readable media of claim 14 wherein the audio is received in a communication from the individual and the instructions, when executed, further cause the computing device to select the at least one voice print for exclusion based on a characteristic of the communication.

18. The computer-readable media of claim 17 wherein the characteristic of the communication is one of a phone number from which the communication originated, a network address of a device from which the communication originated, and a device identifier of a device from which the communication originated.

19. The computer-readable media of claim 14 wherein the instructions, when executed, further cause the computing device to:

determine which confidence score of the one or more confidence scores is the highest confidence score;

prompt the individual to answer one or more security questions responsive to a determination that the highest confidence score is less than the predetermined upper threshold and greater than a predetermined lower threshold; and
authenticate the individual when the individual correctly answers a predetermined number of the one or more security questions.

\* \* \* \* \*